United States Patent
Karnik et al.

(10) Patent No.: US 11,227,267 B2
(45) Date of Patent: Jan. 18, 2022

(54) METHODS AND SYSTEMS FOR MAKING A PAYMENT

(71) Applicant: Mastercard International Incorporated, Purchase, NY (US)

(72) Inventors: Ajit Madhukar Karnik, Pune (IN); Supriya Kumthekar, Pune (IN); Rupali Devashish Pandya, Pune (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 1056 days.

(21) Appl. No.: 15/357,204

(22) Filed: Nov. 21, 2016

(65) Prior Publication Data
US 2017/0178097 A1 Jun. 22, 2017

(30) Foreign Application Priority Data
Dec. 21, 2015 (SG) .............................. 10201510507P (51) Int. Cl.
*G06Q 20/10* (2012.01)
*G06Q 20/32* (2012.01)
(Continued)

(52) U.S. Cl.
CPC ..... *G06Q 20/102* (2013.01); *G06K 19/06037* (2013.01); *G06K 19/06112* (2013.01);
(Continued)

(58) Field of Classification Search
CPC .. G06Q 20/02; G06Q 20/20; G06K 19/06037; G06K 19/06112
(Continued)

(56) References Cited

U.S. PATENT DOCUMENTS

| 8,280,776 B2 * | 10/2012 | Coulter ................. G06Q 20/02 235/380 |
| 8,577,810 B1 * | 11/2013 | Dalit ....................... G06F 21/32 705/1.1 |

(Continued)

FOREIGN PATENT DOCUMENTS

WO 20150180785 A1 12/2015

OTHER PUBLICATIONS

International Search Report and Written Opinion issued by the International Search Authority dated Feb. 27, 2017 in corresponding PCT Application No. PCT/US2016/062426 (13 pages).

*Primary Examiner* — Vanel Frenel
(74) *Attorney, Agent, or Firm* — Buchanan Ingersoll & Rooney PC (57) ABSTRACT

A method is proposed for a payer, to make a payment to a payee, such as a merchant. The payer's communication device automatically acquires payment facilitation data comprising payee account identification data identifying a payment account associated with the payee and maintained by an acquirer. The payment facilitation data preferably also includes transaction data describing the payment, such as the amount of the payment. From the payment facilitation data, the communication device generates a payment request which is transmitted to an issuer at which the payer maintains a payment account. The issuer communicates with the acquirer, typically via a payment network, to arrange for a payment to be made, and the payment is credited to the payment account associated with the payee, and debited from the payment account associated with the payer. Thus, a payment is effected without the payee ever receiving confidential information about the payer's payment account.

12 Claims, 8 Drawing Sheets

(51) Int. Cl.
  *G06Q 20/20* (2012.01)
  *G06K 19/06* (2006.01)
  *G06Q 30/06* (2012.01)

(52) U.S. Cl.
  CPC ........... *G06Q 20/20* (2013.01); *G06Q 20/204* (2013.01); *G06Q 20/325* (2013.01); *G06Q 20/3276* (2013.01); *G06Q 30/0601* (2013.01)

(58) Field of Classification Search
  USPC ............. 705/17, 18, 21, 39, 41, 40, 44, 400; 715/737
  See application file for complete search history.

(56) References Cited

U.S. PATENT DOCUMENTS

| | | | | |
|---|---|---|---|---|
| 8,732,042 B2* | 5/2014 | Hammad | ............... | G06Q 40/10 235/379 |
| 10,169,760 B2* | 1/2019 | Pourfallah | ......... | G06Q 20/3276 |
| 2001/0044787 A1* | 11/2001 | Shwartz | ................. | G06Q 20/00 705/78 |
| 2008/0283594 A1* | 11/2008 | Unbehagen | ............ | G06Q 20/12 235/380 |
| 2011/0202415 A1* | 8/2011 | Casares | ................... | G06Q 20/20 705/17 |
| 2011/0251910 A1* | 10/2011 | Dimmick | ............... | G06Q 20/12 705/17 |
| 2011/0289000 A1* | 11/2011 | Palermo | ................. | G06Q 20/12 705/44 |
| 2012/0072296 A1* | 3/2012 | Sinton | .................... | G06Q 30/06 705/17 |
| 2012/0317628 A1 | 12/2012 | Yeager | | |
| 2014/0101036 A1 | 4/2014 | Phillips | | |
| 2014/0122328 A1* | 5/2014 | Grigg | ................... | G06Q 20/322 705/40 |
| 2014/0279469 A1* | 9/2014 | Mendes | ............. | G06Q 20/3274 705/41 |
| 2014/0372308 A1* | 12/2014 | Sheets | .................... | G06Q 20/32 705/44 |
| 2016/0247134 A1* | 8/2016 | Kimberg | ............. | G06Q 20/102 |
| 2017/0308875 A1* | 10/2017 | O'Regan | ............. | G06Q 20/085 |
| 2018/0107992 A1* | 4/2018 | Al-Bedaiwi | ......... | G06Q 20/367 |

* cited by examiner

METHODS AND SYSTEMS FOR MAKING A PAYMENT

SUMMARY OF THE INVENTION

The present invention relates to methods and systems for permitting individuals to make a payment.

BACKGROUND OF THE INVENTION

Currently the mechanisms by which payment cards are used to make purchases are based on a 4-party payment process. The four parties are: a payer (e.g. a consumer) who wishes to make a payment using his or her payment card; a payee (e.g. a merchant), who wishes to receive the payment; an issuer (typically a bank) which issued the payment card; and an acquirer (again, typically a bank) at which the merchant maintains a payment account.

The 4-party payment process is as follows. Let us assume that the consumer is located at a point-of-sale (POS) in a retail location (e.g. one operated by the merchant) the consumer presents his or her payment card to a POS terminal of the merchant. The POS terminal reads payment card data from the payment card. The POS terminal generates a payment request containing the payment card data and additional data relating to the merchant and the payment which is to be made, and transmits this payment request to the acquirer (often in an encrypted form, and/or with other forms of security). The acquirer uses the data in the payment request to contact the issuer to request the payment (typically, this contact is made using a payment network such as the one operated by MasterCard Inc.). The issuer determines whether to authorize the payment (e.g. depending on the account balance in a payment account maintained by the issuer, and associated with the user and the payment card or if adequate credit balance is available—in case of a credit card). If the payment is authorized, the issuer arranges with the acquirer via the payment network that the payment to the acquirer will be made (typically the payment is not instantaneous, but is performed during a later clearing operation involving multiple payments), and the acquirer credits the payment to the payment account of the merchant.

In another implementation of the 4-party payment process, the consumer may be in contact with the merchant remotely, e.g. over the internet. In this case, the consumer typically transmits the payment card data to the Merchant over the internet. Recently, digital wallet systems such as MasterPass have been proposed in which the consumer makes it possible for the merchant to receive the payment card data from a remote server, rather than directly from the consumer over the internet, but once the merchant has received the payment card data, it is used in a 4-party payment process exactly as if the merchant had received it using a POS terminal.

The 4-party payment process has remained substantially the same since the early days of payment card transactions, even though payment cards have changed substantially in the meantime. For example, early plastic payment cards encoding the payment card data on a magnetic stripe, have been replaced by plastic payment cards having embedded smart chips and contactless interfaces, in which the payment card data is transmitted wirelessly to the POS terminal in an encrypted form. Indeed, the above 4-party payment process continues to be followed as plastic payment cards are replaced by payment using smartphones. In these systems, the smartphone comprises a near-field communication (NFC) controller located in the smartphone. The NFC controller acts as a communication interface between the POS terminal and a "secure element" located within the smartphone which emulates the contactless card. Increasingly, the secure element itself is expected to be replaced by software (host card emulation, HCE), but the 4-party payment process is still widely expected to remain the same.

Despite this, the 4-party payment process suffers from a number of disadvantages. In particular, since the merchant (e.g. POS terminal operated by the merchant receives the payment card data, there is a risk that it will be abused, either by a dishonest merchant, or if there is a breach in the merchant's security system which results in the payment card data becoming available to criminals. The latter risk is particularly severe in the case that the merchant stores the payment card data, as many merchants do.

SUMMARY OF THE INVENTION

The present invention aims to provide new and useful systems and methods for making a payment which address the problems of conventional systems and methods noted above.

In general terms, the invention proposes that in order to make a payment, a communication device associated with a payer (typically a consumer) automatically acquires, from a payee (typically a merchant), payment facilitation data comprising payee account identification data identifying a payment account associated with the payee and maintained by an acquirer bank ("acquirer"). The payee account identification data need not be the payee's full bank account details. Instead, it may be other, non-sensitive data sufficient to identify the payment account, such as an ID number of the acquirer, and an ID number for the payee which can be recognised by the acquirer The payment facilitation data preferably also includes transaction data describing the payment, such as a transaction identity number and the amount of the payment ("the payment amount"). From the payment facilitation data, the communication device generates a payment request which is transmitted to an issuer which maintains a payment account associated with the payer. The issuer communicates with the acquirer, typically via a payment network, to arrange for a payment to be made to the acquirer (possibly at a later time as part of a clearing operation), and the payment is credited to the payment account associated with the payee, and debited from the payment account associated with the payer. The payment credited to the payment account associated with the payee may be for the payment amount, or the payment amount minus a handling charge.

Thus, embodiments of the invention do not require the communication device to transmit payment card data to the payee, and the payer does not have to trust the payee. Instead, the payer only has to trust the issuer.

Consequently, the risks associated with a dishonest payee and/or a breach of the payee's security system, may be significantly reduced, or even totally eliminated. Note also that this can be achieved without the payee supplying to the communication device any information which is sensitive: all the payment facilitation data may be either public domain data or data relevant only to the transaction.

Since the issuer is typically a bank in which the payer chooses to keep his or her money, this is a trust relationship which already exists in a conventional payment card system of the kind discussed above. Similarly, the other trust relationships required in preferred embodiments of the invention are ones which already exist in conventional payment systems. That is, the payee in a conventional payment system has a trusted relationship with the acquirer, who manages their payment and settlement process (for example, the payee in a conventional payment system trusts the acquirer sufficiently to pass the payer's payment card information to it). Similarly, in conventional payment systems, the issuer, acquirer and payment network have a relationship of trust between them.

From another point of view, an advantage of preferred embodiments of the present invention is that since payment card data is not sent to the payee, the payee does not incur the risks associated with handling the payment card data. A payee in an embodiment of the present invention may be regulated using a less onerous standard than the PCI standard of conventional payment systems. Consequently, the equipment which the payee has to maintain (e.g. a point of sale (POS) terminal, as mentioned below) may be less complex and/or cheaper and/or easier to maintain or update than in conventional payment systems.

Preferably the payment request sent to the issuer does not include the payment card data. Instead, it may contain other payer information by which the issuer identifies the payment account associated with the payer. The payer information may for example be identity data of the communication device, if the communication device has been pre-registered with the issuer, such that a database accessible to the issuer stores the correspondences between the communication device and one or more payment accounts of the payer (if there are multiple accounts, the payer information would specify one of them, or this piece of information might be supplied later in the payment process). Alternatively, the payer information may be a username of the payer. In a further alternative, it may be a nickname for a payment card, such as a nickname assigned during a previous device/application registration process. Note that if nicknames are assigned to payment cards, the payment may have any number of payment cards (e.g. debit card(s), credit card(s), or prepaid card(s)) issued by the issuer, with each being addressed and identified by a respective nickname. Since there is no need for payment card data to be transmitted in an embodiment of the invention, there is additional security.

The communication device typically includes security features such as a personal identity number (PIN), seeking response to a security question, and/or biometric identification features (e.g. fingerprint recognition), so a thief who steals the communication devices should not be able to use the device to make a payment. Indeed, there may be no need for the payment card data ever to be entered into communication device, which gives additional security in case the communication device is ever stolen.

Furthermore, the flow of messages in an embodiment of the invention may be simpler than in a conventional system, leading to a reduced computational burden. This in turn means it can be implemented using cheaper computer technology.

The generation of the payment request typically involves user interaction and approval, and preferably the following of a security protocol, e.g. one in which the user supplies a password and/or biometric data to be compared (by the communication device and/or the issuer, with a predetermined password or pre-determined biometric data). Thus, preferred embodiments of the invention may not be vulnerable to some other of the risks associated with some conventional payment cards, such as relay attacks.

The security protocol might further require the payer to send a message to the issuer sever in another format, e.g. an SMS message. For example, the issuer server might send the software application as verification code, which the payer must return to the issuer server by SMS.

One application of the invention is in a retail location, for example one in which a POS (point-of-sale) terminal is provided. In this case, the communication device may capture the payment facilitation data automatically from the POS terminal.

This may be done in any one or more of several ways. Firstly, it may capture it using the camera of the communication device, if the payee displays an image encoding the payment facilitation data such as a QR (quick response) code. The POS may include a processor for defining a suitable image (i.e. as a data-set describing the image), and a screen for displaying the image to the camera. In other embodiments, the communication device may receive the payment facilitation data by a wireless (e.g. radio frequency) communication using an aerial of the communication device, for example by a Near Field Communications (NFC) or Bluetooth low energy (BLE) communication according to the respective communication standard.

An alternative application of the invention is a case in which the payer is using a computing device (e.g. a personal computer (PC)) which is separate from the communication device, to perform online shopping. The computing device may be in communication with a server operated by the payee (or a business partner of the payee) over a communication network such as the internet. In this case, the communication device may acquire the payment facilitation data automatically from the computing device. For example, the server may generate an image (e.g. a QR code) which is transmitted to the computing device and displayed on a screen of the computing device, for capture by the camera of the communication device. Alternatively, the computing device may transmit the payment facilitation data wirelessly to the communication device using respective aerials of the computing device and communication device.

In a further possible application of the invention, the payer may use the communication device itself for online shopping. That is, the communication device communicates via a communication network such as the internet with a server of the payee (or a business partner of the payee). In this case, the server may transmit the payment facilitation data to the communication device over the communication network.

As used in this document, the term "payment card" refers to any cashless payment device associated with a payment account, such as a credit card, a debit card, a prepaid card, a charge card, a membership card, a promotional card, a frequent flyer card, an identification card, a prepaid card, a gift card, and/or any other device that may hold payment account information, such as mobile phones, Smartphones, personal digital assistants (PDAs), key fobs, transponder devices, NFC-enabled devices, and/or computers. The payment account associated with the payment card may be a credit account, or a bank account of a conventional type.

The term "automatic" is used to refer to a process which is performed without human involvement save for initiation of the process, or a for confirmation step during the process which permits the process to be completed.

As noted above, the payer is typically a consumer who wishes to make a payment to a payee who is a merchant, i.e. in return for the merchant supplying a good and/or service. However, the invention is not limited in this respect. For example the payee could be a charitable organisation, and the payer may be a donor. Or the payee could be a government organisation, and the payer may be a tax payer, or an individual paying a fine.

The payment may be on behalf of an organization with which the payer is associated. If so the payment account associated with the payer may be one in the name of the organisation. In this case, the communication device may be owned or leased by the organisation, rather than the payer who operates the communication device on behalf of the organisation. Alternatively, the payer may use a communication device which he or she personally owns.

Similarly, in principle, the payee may receive the payment on behalf of a business partner, such as a commercially related entity to the payee. For example, it is possible to envisage a retail environment operated by the payee in which, when a POS sale terminal operated by the payee is used to purchase an item, some or all of the payment passes to a bank account which is in the name of a company commercially related to the payee. In other words, the payment account associated with the payee may in fact be one in the name of the business partner of the payee.

The invention may be expressed as a method performed by a computerized system which is the network of interacting electronic devices which cooperate to perform the payment process. Alternatively, it may be expressed in terms of the computerized system itself, arranged to perform the method. Alternatively, it may be expressed in terms of the payer's communication device and/or the method it performs. Alternatively, it may be expressed in terms of the computer program product (i.e. software application) which is run by a processor of the payer's communication device. This software application may be stored in non-transitory form in a tangible data storage device of the communication device, or (e.g. before it is downloaded) in a tangible data storage device accessible to another computer system, such as the issuer. The invention may further be expressed in terms of the payee's computer system, or the method it performs.

BRIEF DESCRIPTION OF THE DRAWINGS

An embodiment of the invention will now be described for the sake of example only with reference to the following drawings, in which.

DETAILED DESCRIPTION OF THE EMBODIMENTS

Figure 1:
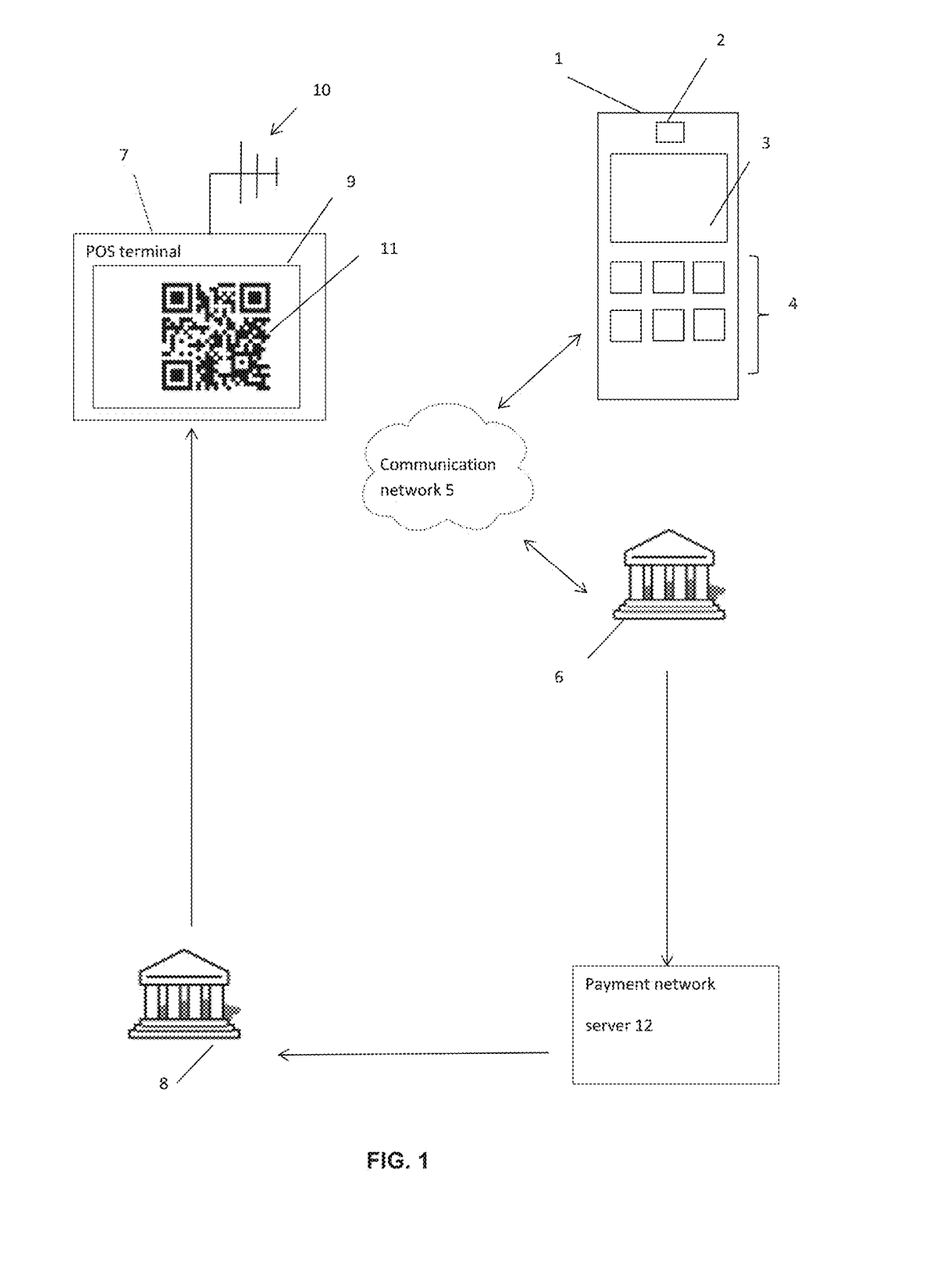
FIG. 1 shows schematically a first computerized system, which is a network of electronic devices for performing a method which is a first embodiment of the invention.

Referring firstly to FIG. 1, a first system which is an embodiment of the invention is shown. The system includes a communication device 1 associated with (e.g. operated by and/or or owned/leased by) an individual ("payer") who wishes to make a payment from a pre-existing payment account (e.g. bank account) associated with the payer and maintained by an issuer (e.g. a bank), to a payment account associated with a payee and maintained by an acquirer (e.g. a bank). In some cases, the issuer and the acquirer will be the same, but for simplicity it is assumed below that they are different.

The payment made by the payer may on behalf of another party (e.g. an organisation with which the payer is associated, e.g. using a bank account in the name of the organisation), but in the following description, for simplicity, it is assumed that the payer makes the payment on his/her own behalf, from a payment account in the payer's name. Similarly, it is assumed for the sake of simplicity that the payment account associated with the payee is in the name of the payee, although in principle it might be in the name of a business partner of the payee.

The communication device 1 is a mobile device (e.g. smartphone, tablet computer). It includes a camera 2, a screen 3 and data input devices (e.g. buttons) 4. The screen 3 may be touch sensitive, so as to function, with the data input devices 4, as a user interface; of the data input devices 4 may play the role of the user interface on their own. The communication device 1 further includes a communication interface such as a reception/transmission (RX/TX) wireless transceiver (not shown) incorporating an aerial. The wireless transceiver is in wireless communication with a communication network 5. The communication may for example be via WiFi, 3G or 4G standards, and the communication network 5 allows the communication device 1 to communicate with remote computer equipment, e.g. over the Internet.

The communication device is provided with a software application, which may have been previously downloaded from an issuer server 6 operated by the issuer. The software application is able to communicate with the issuer server 6 over the communication network 5.

In the situation of FIG. 1, the payer is located in premises operated by the payee. Typically, the payee is a merchant, and the premises are retail premises associated with the merchant in that they are operated by the merchant, or a business partner of the merchant. At the retail premises, the payee maintains a point-of-sale terminal 7.

The POS terminal 7 is in communication with a computer server 8 ("acquirer server") operated by the acquirer. This may be via the communication network 5 or in some other way. The point of sale terminal 7 has a screen 9 and/or a wireless transceiver 10.

Figure 2:
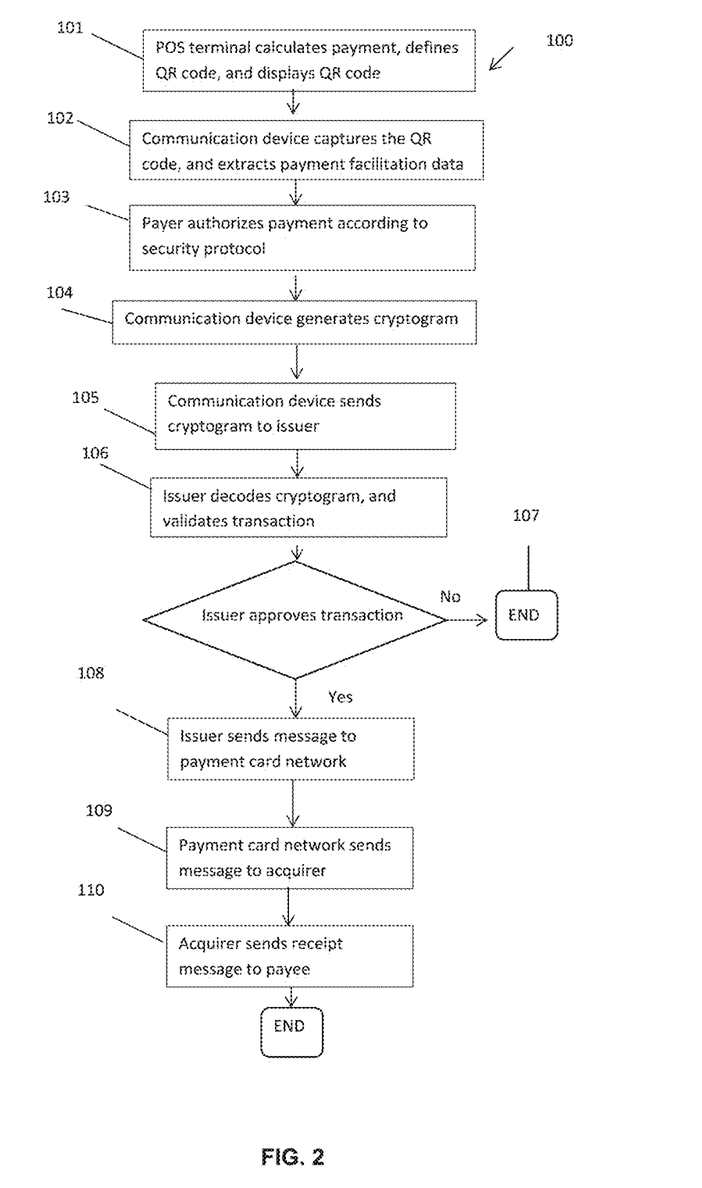
FIG. 2 shows a method performed by the computerized system of FIG. 1.

Referring to FIG. 2, the method 100 performed by the system of FIG. 1 is described.

In the retail premises, the payer chooses one or more goods and/or services (here termed generally "products) which he wishes to pay for using the point-of-sale (POS) terminal 7; that is, make a payment transaction. At this stage, the consumer may activate the software application on the communication device 1.

In step 101, the POS terminal 7 calculates the amount of money to be paid by the payer for the goods, and generates a message to the application on the communication device 1.

The message incorporates payment facilitation data. The payment facilitation data includes at least payee account identification data which is sufficient to specify the payee's payment account at the acquirer. In one possibility the payee account identification data could be full details of the payee's payment account and the acquirer where the account is held. However, since this data is sensitive, more preferably the payment account number is a merchant identity number, and information sufficient to identify the acquirer, such as an acquirer ID number. The acquirer ID number is sufficient to identify the acquirer, so that the issuer knows who to send payment to (typically during a clearing operation). The merchant ID is sufficient to identify the payee (merchant) to the acquirer, so that the acquirer knows which payment account to credit the payment to. Note that if the merchant holds multiple accounts with the acquirer, then one of those accounts may be used by default to receive payments. The payee account identification data may specify which account is to be used.

The payment facilitation data preferably further includes other information, such as identity number of the POS terminal 7, and the currency (dollar, euro, yen, . . . ) of transactions accepted by the POS terminal 7. Some of the other information is transaction data describing the payment transaction (i.e. specific to a single payment transaction), such as the amount of the payment, a transaction identity number, etc. The other information may also include location information specifying a location of the merchant or POS terminal 7. (Note, however, that a variation of the embodiment is mentioned below in which the payment facilitation data does not include transaction data.)

The payment facilitation data may be sent to the communication device 1 by defining (i.e. algorithmically generating) an image comprising the payment facilitation data, and using the screen 9 to display the image 11, so that the image 11 can be captured using the camera 2 of the communication device 1, which extracts the payment facilitation data. Conveniently, the image 11 may be in the form of a QR code, and the application includes a module for decoding the QR code to extract the payment data.

In step 102, the communication device 1 captures the QR code using the camera 2, and the software application extracts the payment facilitation data.

In step 103, the application presents details of the transaction to the payer using the screen 3 of the communication device, and seeks approval for the payment. If the payer agrees with the details of the transaction (e.g. the amount), the payer may seek approval for the transaction from the issuer by performing a data input, e.g. using the data input devices 4 (or the screen 3 if it is touch sensitive). As part of this procedure the user may be required to perform a security protocol, such as supplying a secret password (PIN and/or an answer to a secret question—which is known only to the consumer) and/or providing biometric data (e.g. a fingerprint or retinal scan) for verification by the issuer server 6 (and optionally the software application itself).

In some forms of the embodiment, the user may have multiple payment accounts at the issuer, and in this case, step 103 may include selecting one of them.

In step 104, the software application incorporates the payment facilitation information into an encoded message (cryptogram). In step 105, the software application controls the communication device to send the cryptogram to the issuer server 6.

As noted above, the payment facilitation data may include location information specifying a location of the merchant or POS. Similarly, the cryptogram may include second location information generated by the communication device (for example by a global positioning system (GPS) device within the communication device) and specifying the location of the communication device.

The cryptogram further includes payer information sufficient to specify to the issuer the payment account associated with the payer. In principle, the payer information could be payment card data for a payment card associated with the payer's payment account (the payment card data could be pre-stored in the communication device 1, or be entered by the payer as part of step 103). Or the payment information could be the payment account number.

However, more preferably, the payer information is a token (e.g. a username or identity number of the payer, or an identity number of the communication device 1) which is associated with information about the payer's payment account in a database (not shown) of the issuer server 6, such that using the token the issuer server 6 can identify the payment account associated with the payer. The token may be pre-stored in the communication device 1, or be entered by the user in step 103. Even if the cryptogram is intercepted and decoded, or the communication device 1 is stolen, the token will be of less use to a potential thief than payment card data. Thus, the present invention makes possible a "cloud-based" payment system, in which all highly-confidential payment account information is present only in the database accessible by the issuer server 6, remote from the payer, and indeed located in a place which is independent of the payer's location.

In step 106 the issuer server 6 decodes the cryptogram, and extracts the payment facilitation data, including the amount of the transaction, and also extracts the payer information. If the payment facilitation data includes location data specifying the location of the merchant or POS terminal, and the cryptogram also includes second location data specifying the location of the communication device, the issuer server 6 checks if they match, in order to verify that the payer is actually at the merchant. The fact that the locations match can serve as an additional security feature. The issuer server 6 checks the validity of the payer information, and, if it is correct, it proceeds to check the balance available in the payment account (if the payment card is a debit card, this may be the amount by which the account is in credit; or it may be the credit balance in the case of a credit card). Based on the balance, the issuer server 6 decides whether to decline or accept the transaction.

If the issuer declines the transaction, then in step 107 a message is sent to the payee via the acquirer (and optionally to the payer), and the method ends. The issuer server 6 may obtain the identity of the acquirer from the acquirer ID number, so that it can send the message to the correct acquirer (optionally via a payment card network). For example, the acquirer ID number may be used (e.g. by the payment network) to extract more detailed acquirer/payment gateway information from a database. The message may include the merchant ID number so that the acquirer is able to determine which payee the message is intended for, and forward the message to the payee. The message typically includes the transaction identity number.

Alternatively, if the issuer authorizes the transaction, then in step 108, the issuer server 6 debits the payment account of the payer by the payment amount (optionally, plus a handling charge). This means decreasing the balance in the payment account if the payment card is a debit card; or decreasing the credit balance in the case of a credit card. The issuer server 6 sends a second message to a server 12 of a payment card network which acts as an intermediary between the issuer bank server 6 and the acquirer server 8. The payment card network is trusted by both the issuer bank and the acquirer, which may not know each other. The message is a guarantee that the issuer bank will make a payment to the acquirer—although this payment may not be instantaneous; more likely it will be during a subsequent clearing operation, as in conventional payment processes.

The second message would typically include at least the acquirer/gateway information, the merchant ID, and the transaction identity number.

In step 109, the payment card network server 12 sends a third message to the acquirer server 8, indicating that the payment will be made. The third message would typically include at least the transaction identity number and the merchant ID. Note that steps 108 and 109 can be considered as a single step in which a message passes from the issuer bank to the acquirer (via the payment card network). Optionally, the third message can be identical to the second message, i.e. the payment network just acts as a "pass through" or "carrier" which transports the second message from the issuer bank to the acquirer.

In step 110, the acquirer server 8 uses the merchant ID to identify the payee, and sends a receipt message to the POS terminal 7 of the payee. The receipt message typically includes the transaction identity number, and indicates that payment from the issuer has been received (or is expected), and that the payment will be paid, or has been paid, into the payment account associated with the payee.

The method then terminates. The merchant releases the purchased goods and/or services to the payer.

A number of variations to the embodiment above are possible within the scope of the invention. For example, since, as noted, the message sent by the POS terminal 7 to the communication device 1 may just include the payment facilitation data, which is typically unchanging, the image 11 may be same for all payers and all transactions. In this case, it could be pre-defined, and displayed other than via a screen (e.g. as a printed image). In this case, the payer 1 might use the data input device 4 and/or touch sensitive screen 3 to enter into the communication device 1 the transaction data (e.g. specifying the payment amount and currency, and optionally a transaction ID which allows the payment to be easily matched to the payee), so that the software application can include it in cryptogram. However, this is less preferable than in the embodiment explained in detail above, in which the message sent by the POS terminal 7 includes information specific to the transaction. For example, the variant requires the payer to enter the payment amount and optionally a transaction ID. By contrast, in the embodiment explained in detail above, the communication device 1 is able to generate a message to the issuer bank server 6 without the payer entering a payment amount (and/or not a transaction ID).

In a further variation, instead of the POS terminal 7 sending the payment facilitation data using an image for capture by the camera 2, it may communicate wirelessly with the communication device 1 using the aerial 10, as a wireless signal which is captured by the aerial of the communication device 1. For example, it may send a message wirelessly to the communication device 1 including the payment facilitation data, as a Near Field Communications (NFC) or Bluetooth low energy (BLE) communication.

In a further variation of the invention, the software application may in step 104 establish a secure communication channel (e.g. a secure communication channel using the SSL (secure sockets layer) form of VPN (virtual private network)). In this case step 104 may not include the generation of a cryptogram; if not, step 105 would not include transmitting such a cryptogram and no cryptogram decryption is required in step 106.

Figure 3:
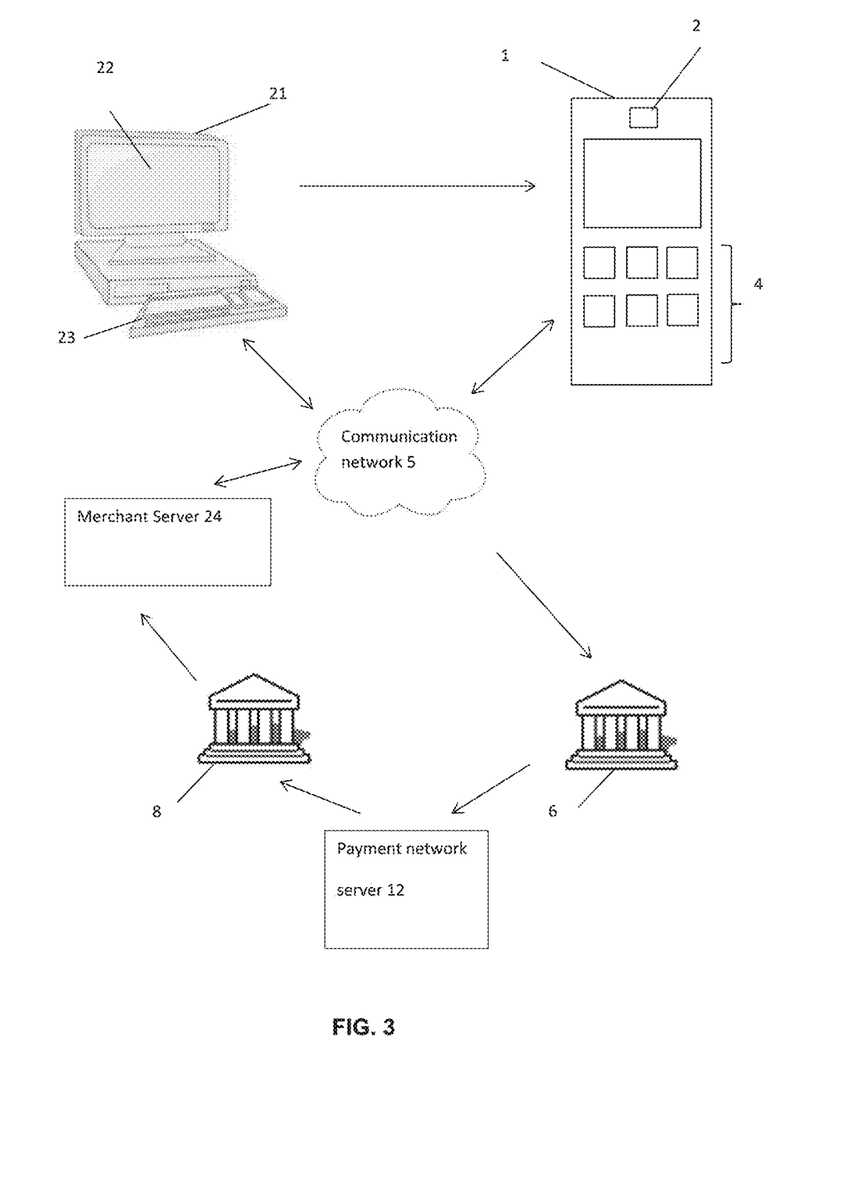
FIG. 3 shows schematically a first computerized system, which is a network of electronic devices for performing a method which is a first embodiment of the invention.

Turning to FIG. 3 a second system which is an embodiment of the invention is illustrated. Like elements are given the same reference numerals as in FIG. 1. In this system, the payer operates two computing devices: a communication device 1 of the kind described above, and a computing device 21 such as a PC. The second computing device has a screen 22 and one or more data input devices 23 such as a keyboard. The payer uses the computing device 21 to communicate over a communication network 5 with a merchant server 24 which operates an online store. As in the first embodiment, the payer is associated with a bank account at an issuer which operates an issuer server 6. The merchant server 24 is operated by a merchant who is associated with a bank account maintained at an acquirer.

The online browsing experience of the payer on the merchant store may be as in a conventional system. When the payer wishes to make a payment to the online store, he clicks on a checkout button to initiate a checkout process. The payment step of the payment process involves the method 200 shown in FIG. 4. Almost all the steps are the same as the method 100 shown in FIG. 2, and corresponding steps are denoted by reference numerals one hundred (100) higher.

Figure 4:
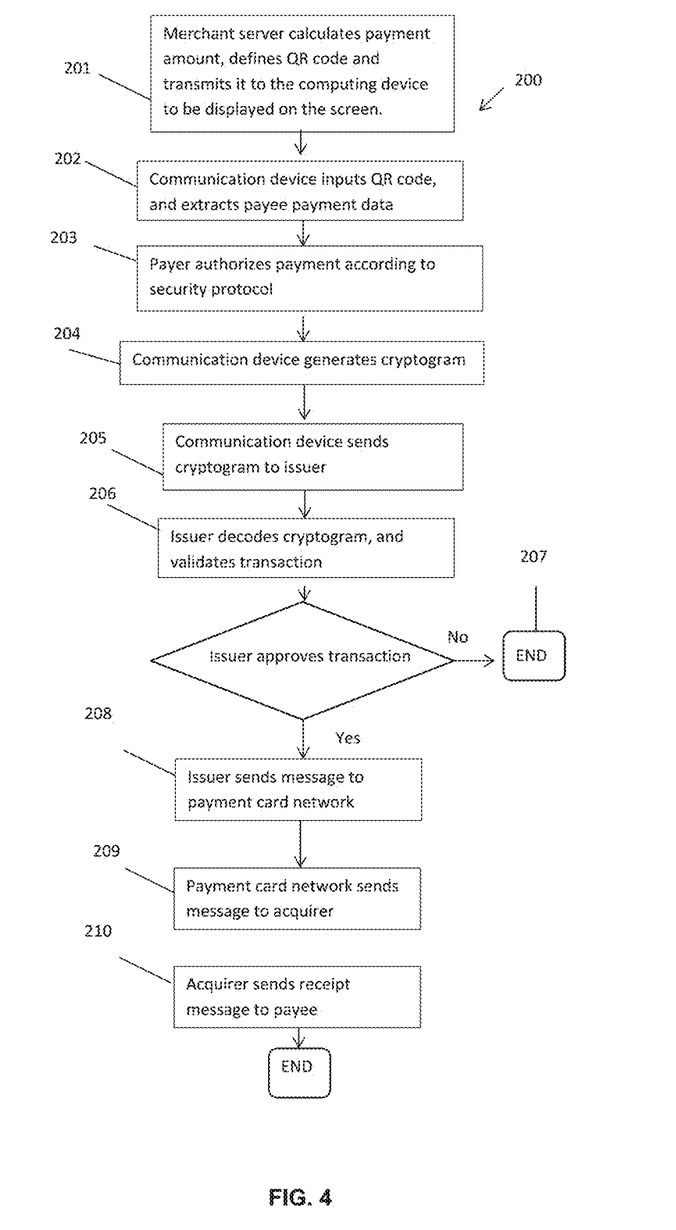
FIG. 4 shows a method performed by the computerized system of FIG. 3.

In step 201, the merchant server 24, which has worked out the total payment for the order defines an image, such as a QR code, comprising the payment facilitation data. The payment facilitation data, as in the first embodiment, comprises the payee account identification data, and preferably also data describing the transaction (e.g. the amount of the transaction). The server 24 transmits the image to the computing device 21 as part of the code which the merchant server 24 uses to control what is displayed on the screen 22 of the computing device 21. Thus, the image is displayed on the screen 22.

In step 202, the camera 2 of the communication device 1 captures the QR image from the screen 22, and extracts from it the payment facilitation data. Steps 203-210 are then identical to the corresponding steps 103-110 of method 100. In step 210, the acquirer sends the message to the merchant server 24.

Figure 5:
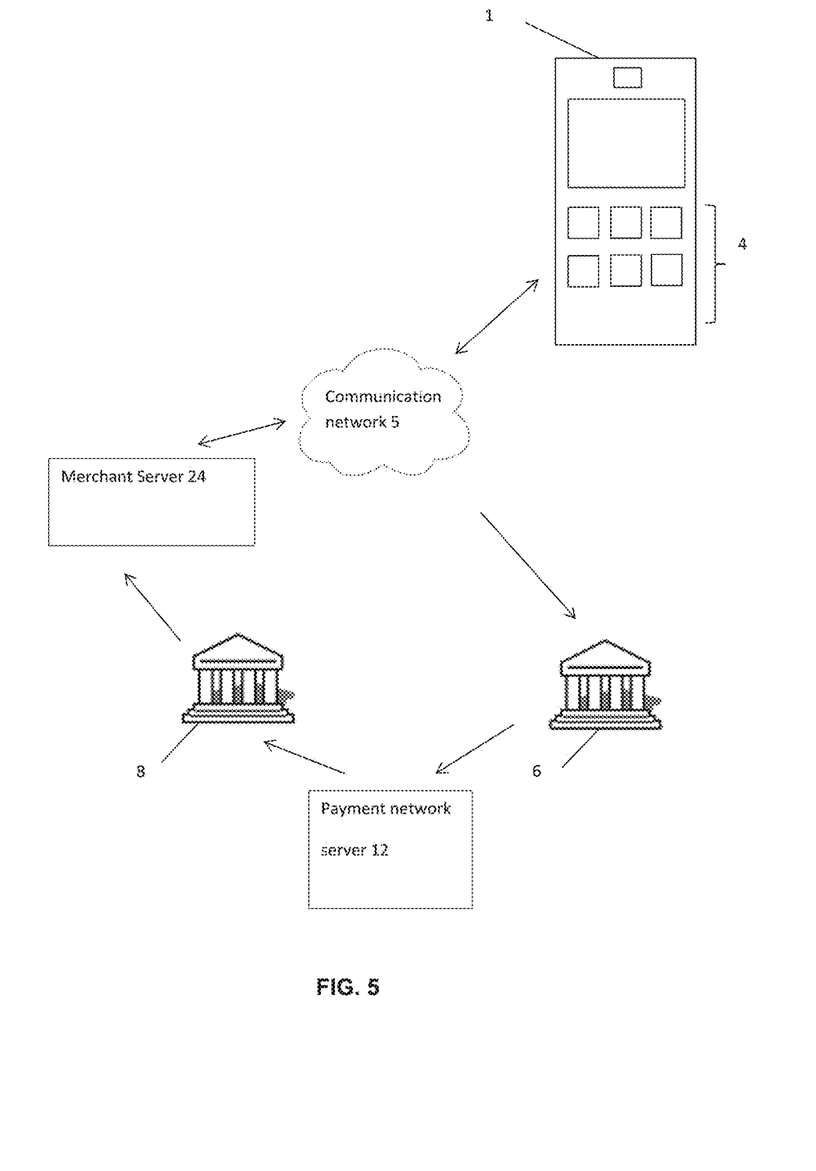
FIG. 5 shows schematically a first computerized system, which is a network of electronic devices for performing a method which is a first embodiment of the invention.

FIG. 5 shows a third system which is an embodiment of the present invention. All components of the third embodiment correspond to components of the second embodiment and are denoted by identical reference numerals. In the third embodiment, as in the second, the payer, who is associated with a bank account at the issuer, performs online shopping at an online store generated by a merchant server 24, maintained by a merchant with a payment account at the acquirer. However, in the third embodiment the payer does the shopping using the communication device 1 itself, over the communication network 5.

Figure 6:
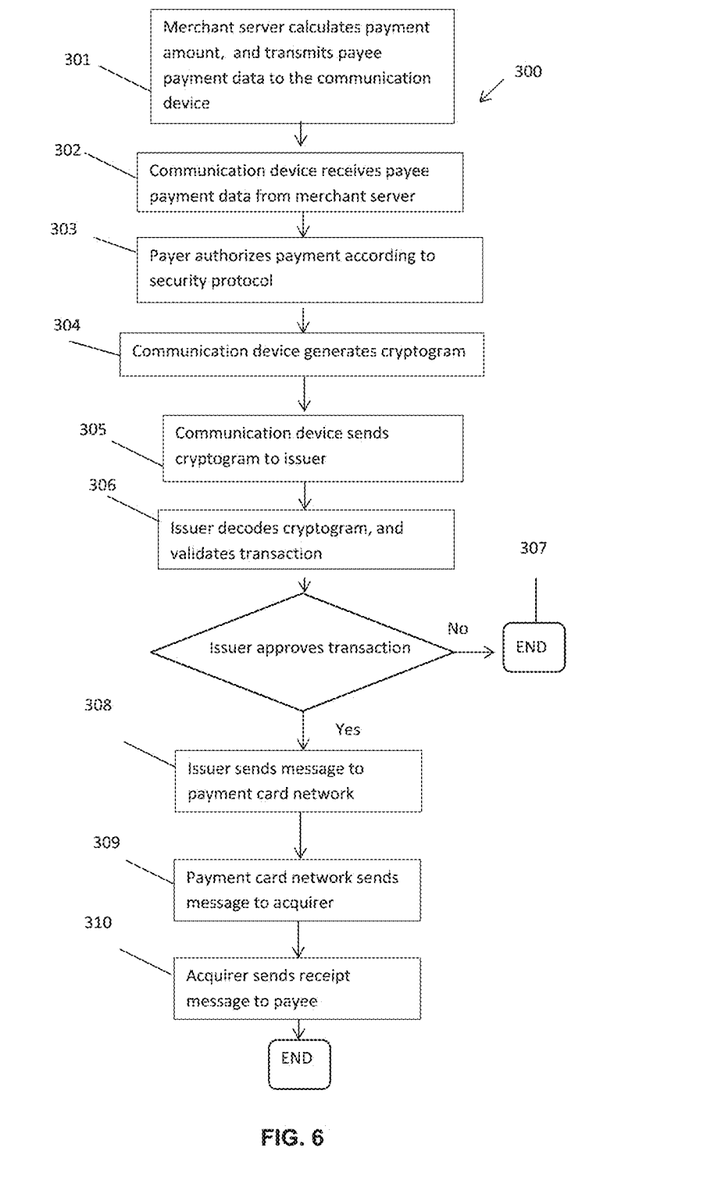
FIG. 6 shows a method performed by the computerized system of FIG. 5.

Having completed the shopping, the payer clicks on a checkout option to initiate the check-out process including a payment process 300. The payment process 300 is as shown in FIG. 6. Steps corresponding to those of FIG. 3 are given reference numerals one hundred (100) higher.

In step 301, the merchant server 23 calculates the payment amount, and transmits payment facilitation data to the communications device 1. As in the first and second embodiments, the payment facilitation data comprises the payee account identification data, and preferably also data describing the transaction (e.g. the amount of the transaction). The payment facilitation data may be sent to the communications device 1 over the communication network 5, possibly in encrypted form.

In step 302, the communication device 1 receives the payment facilitation data, and decodes it if it is encrypted. Thus, in the third embodiment, there is no need for an image such as a QR code to be captured by the camera 2. Steps 303-310 are the same respectively as steps 203-201 of method 200.

Figure 7:
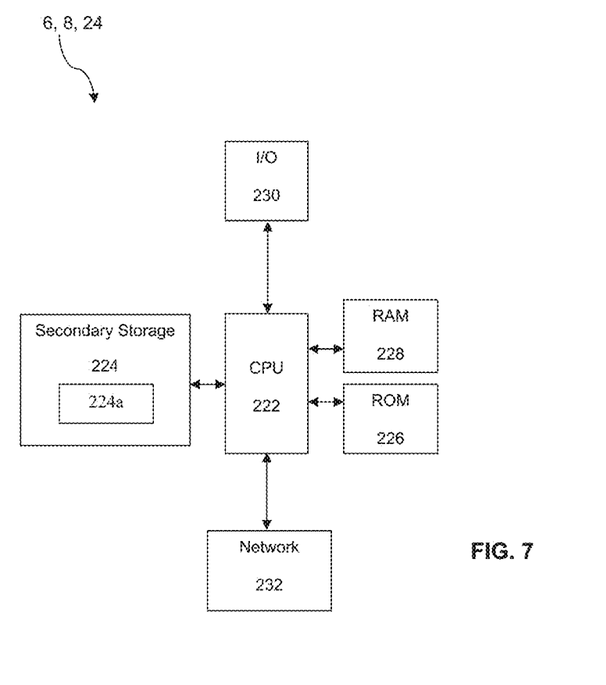
FIG. 7 is a block diagram of the technical architecture of the servers of FIGS. 1, 3 and 5.

FIG. 7 is a block diagram showing a technical architecture of the issuer server 6, the payment network server 12 and the acquirer server 8. The merchant server 24 may also have this technical architecture.

The technical architecture includes a processor 222 (which may be referred to as a central processor unit or CPU) that is in communication with memory devices including secondary storage 224 (such as disk drives), read only memory (ROM) 226, random access memory (RAM) 228. The processor 222 may be implemented as one or more CPU chips. The technical architecture may further comprise input/output (I/O) devices 230, and network connectivity devices 232.

The secondary storage 224 is typically comprised of one or more disk drives or tape drives and is used for non-volatile storage of data and as an over-flow data storage device if RAM 228 is not large enough to hold all working data. Secondary storage 224 may be used to store programs which are loaded into RAM 228 when such programs are selected for execution.

In this embodiment, the secondary storage 224 has a processing component 224a comprising non-transitory instructions operative by the processor 222 to perform various operations of the method of the present disclosure. The ROM 226 is used to store instructions and perhaps data which are read during program execution. The secondary storage 224, the RAM 228, and/or the ROM 226 may be referred to in some contexts as computer readable storage media and/or non-transitory computer readable media.

I/O devices 230 may include printers, video monitors, liquid crystal displays (LCDs), plasma displays, touch screen displays, keyboards, keypads, switches, dials, mice, track balls, voice recognizers, card readers, paper tape readers, or other well-known input devices.

The network connectivity devices 232 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 232 may enable the processor 222 to communicate with the Internet or one or more intranets. With such a network connection, it is contemplated that the processor 222 might receive information from the network, or might output information to the network in the course of performing the above-described method operations. Such information, which is often represented as a sequence of instructions to be executed using processor 222, may be received from and outputted to the network, for example, in the form of a computer data signal embodied in a carrier wave.

The processor 222 executes instructions, codes, computer programs, scripts which it accesses from hard disk, floppy disk, optical disk (these various disk based systems may all be considered secondary storage 224), flash drive, ROM 226, RAM 228, or the network connectivity devices 232. While only one processor 222 is shown, multiple processors may be present. Thus, while instructions may be discussed as executed by a processor, the instructions may be executed simultaneously, serially, or otherwise executed by one or multiple processors.

Although the technical architecture is described with reference to a computer, it should be appreciated that the technical architecture may be formed by two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the technical architecture 220 to provide the functionality of a number of servers that is not directly bound to the number of computers in the technical architecture 220. In an embodiment, the functionality disclosed above may be provided by executing the application and/or applications in a cloud computing environment. Cloud computing may comprise providing computing services via a network connection using dynamically scalable computing resources. A cloud computing environment may be established by an enterprise and/or may be hired on an as-needed basis from a third party provider.

It is understood that by programming and/or loading executable instructions onto the technical architecture, at least one of the CPU 222, the RAM 228, and the ROM 226 are changed, transforming the technical architecture in part into a specific purpose machine or apparatus having the novel functionality taught by the present disclosure. It is fundamental to the electrical engineering and software engineering arts that functionality that can be implemented by loading executable software into a computer can be converted to a hardware implementation by well-known design rules.

Figure 8:
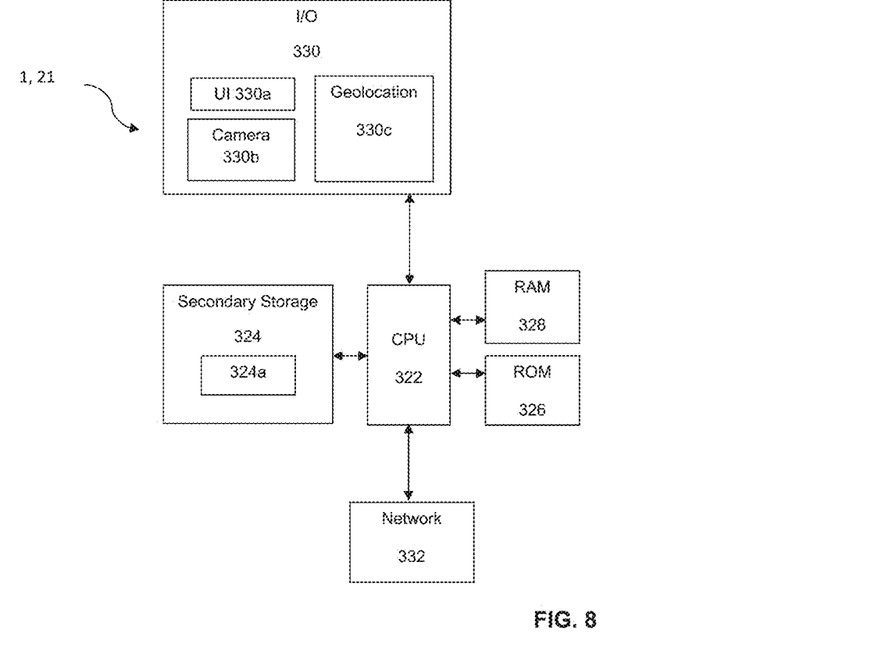
FIG. 8 is a block diagram of a communication device of FIGS. 1, 3 and 5.

FIG. 8 is a block diagram showing a technical architecture of the communication device 1. The POS terminal 7 in the first embodiment, and the computing device 22 in the second embodiment may also take this form. It is envisaged that in all three embodiments, the communication device 1 will be a smartphone or tablet device. In the second embodiment the computing device 22 may take any form (e.g. a PC, laptop, smartphone or tablet device).

The technical architecture includes a processor 322 (which may be referred to as a central processor unit or CPU) that is in communication with memory devices including secondary storage 324 (such as disk drives or memory cards), read only memory (ROM) 326, random access memory (RAM) 328. The processor 322 may be implemented as one or more CPU chips. The technical architecture further comprises input/output (I/O) devices 330, and network connectivity devices 332.

The I/O devices comprise a user interface (UI) 330a, a camera 330b and a geolocation module 330c. The UI 330a may comprise a touch screen, keyboard, keypad or other known input device. The camera 330b allows a user to capture images and save the captured images in electronic form. The geolocation module 330c is operable to determine the geolocation of the communication device using signals from, for example global positioning system (GPS) satellites.

The secondary storage 324 is typically comprised of a memory card or other storage device and is used for non-volatile storage of data and as an over-flow data storage device if RAM 328 is not large enough to hold all working data. Secondary storage 324 may be used to store programs which are loaded into RAM 328 when such programs are selected for execution.

In this embodiment, the secondary storage 324 has a processing component 324a, comprising non-transitory instructions operative by the processor 322 to perform various operations of the method of the present disclosure. The ROM 326 is used to store instructions and perhaps data which are read during program execution. The secondary storage 324, the RAM 328, and/or the ROM 326 may be referred to in some contexts as computer readable storage media and/or non-transitory computer readable media.

The network connectivity devices 332 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), Bluetooth, BLE (Bluetooth low energy), radio frequency identity (RFID), and/or other air interface protocol radio transceiver cards, and other well-known network devices. These network connectivity devices 332 may enable the processor 322 to communicate with the Internet or one or more intranets. With such a network connection, it is contemplated that the processor 322 might receive information from the network, or might output information to the network in the course of performing the above-described method operations. Such information, which is often represented as a sequence of instructions to be executed using processor 322, may be received from and outputted to the network, for example, in the form of a computer data signal embodied in a carrier wave.

The processor 322 executes instructions, codes, computer programs, scripts which it accesses from hard disk, floppy disk, optical disk (these various disk based systems may all be considered secondary storage 324), flash drive, ROM 326, RAM 328, or the network connectivity devices 332. While only one processor 322 is shown, multiple processors may be present. Thus, while instructions may be discussed as executed by a processor, the instructions may be executed simultaneously, serially, or otherwise executed by one or multiple processors.

Whilst the foregoing description has described exemplary embodiments, it will be understood by those skilled in the art that many variations of the embodiment can be made within the scope and spirit of the present invention.

For example, while the descriptions of the embodiments above have not mentioned bank charges, these are compatible with the invention, so that the payment taken from the payer's payment account may be greater than the payment credited to the payee's payment account, with the difference constituting the bank charges, borne by the payer and/or payee. The bank charges may be apportioned to the issuers, the acquirer and the payment network according to a mutual agreement between them. The charges may optionally be different from in conventional systems. For example, the payee may be prepared to pay a higher charge than in a conventional system, in view of the reduced risks it runs in an embodiment of the invention due to not receiving the payer's payment card details.

Similarly, as in existing payment card systems, embodiments of the invention are compatible with discount systems, reward points, etc., as in a conventional payment system.

Furthermore, although the description above refers to only a single message being sent from the communication device 1 to the issuer server 6, in fact the message may be broken into several communications, transmitted at different respective times, e.g. as steps of a security protocol are successively carried out.

In a further variation of the invention, during steps 103, 203 or 303, the payer may arrange for the communication device 1 to communicate with a physical payment card. This would be useful, for example, in the case that the communication device 1 will not be recognised by the issuer, and the user has not set up a user name with the issuer. In other words, in this case, the message to the issuer server 6 might include payment card information which the communication device 1 has read from the physical payment card.

Furthermore, the payment facilitation information may include further information not mentioned above, such as warranty information, or information about additional offers, loyalty points etc. The software application may store this information for later use or reference.

The invention claimed is:

1. A computer-implemented method for a payer associated with a first payment account maintained by an issuer, to make a payment to a payee associated with a second payment account maintained by an acquirer, the acquirer being different from the issuer, the method comprising:
   (i) a communication device associated with the payer, the communication device:
      (a) capturing data, the captured data encoding payment facilitation data comprising payee account identification data identifying the second payment account;
      (b) extracting the payment facilitation data from the captured data;
      (c) using the payee account identification data to generate a first message, the first message including the payee account identification data and transaction data comprising a payment amount; and
      (d) transmitting the first message to an issuer server associated with the issuer, the first message further comprising payer information specifying to the issuer the first payment account, and wherein the first message is transmitted to the issuer server without the payer information of the first message being disclosed to the payee, the acquirer, or an intermediary between the payee and the issuer server;
   (ii) the issuer server, after receiving the first message from the communication device, arranging a payment transaction to the acquirer by sending a second message to a payment network, the second message indicating a guarantee of payment by the issuer server to the acquirer server during subsequent electronic communications of a clearance process;
   (iii) the payment network, upon receiving the second message from the issuer server, sending a third message to the acquirer server; and
   (iv) the acquirer server crediting the payment to the second payment account, and sending a receipt message to a payee computing device associated with the payee, the receipt message indicating the payment to the second payment account.

2. The method according to claim 1, in which the payment facilitation data further comprises the transaction data.

3. The method according to claim 1, in which the payer is located at a retail location associated with the payee, and the payee computing device is a point-of-sale (POS) terminal.

4. The method according to claim 3, further including the payee computing device defining an image encoding the payment facilitation data, a camera of the communication device performing said step of capturing the data by photographing the image.

5. The method according to claim 4, in which the image is a quick response (QR) code.

6. The method according to claim 4, in which the image is displayed by a screen of the point-of-sale terminal.

7. The method according to claim 3, further including transmitting the payment facilitation data wirelessly, an aerial of the communications device performing said step of capturing the data.

8. The method according to claim 1, in which payee computing device is a merchant server implementing an online store, the payer interacting with the online store over a communication network.

9. The method according to claim 8, in which the payee interacts with the online store using the communication device.

10. The method according to claim 8, further including the payee computing device defining an image encoding the payment facilitation data, a camera of the communication device performing said step of capturing the data by photographing the image, in which the image is displayed on a computing device associated with the payer and different from the communication device.

11. The method according to claim 1, in which at least step (d) is only performed after a step of the communication device receiving data input from the payer in a predefined format, the data input in the predefined format being indicative of approving the payment.

12. The method according to claim 11, in which the data input includes biometric data of the payer, and the predefined format is one in which the input biometric data matches predefined biometric data.

* * * * *